United States Patent [19]

Jain et al.

[11] 4,101,891

[45] Jul. 18, 1978

[54] SURFACE ROUGHNESS MEASURING SYSTEM

[76] Inventors: James C. Fletcher, Administrator of the National Aeronautics and Space Administration, with respect to an invention of Atul Jain, Altadena, Calif.

[21] Appl. No.: 744,577

[22] Filed: Nov. 24, 1976

[51] Int. Cl.$^2$ ............................. G01S 9/02; G01S 9/60
[52] U.S. Cl. .................... 343/17.2 PC; 343/5 CM; 343/5 W; 324/77 K
[58] Field of Search ........ 343/100 CL, 5 CM, 5 MM, 343/5 W, 17.2 PC; 324/77 K; 235/181

[56] References Cited

U.S. PATENT DOCUMENTS

| 3,560,973 | 2/1971 | Kazel | 343/5 CM |
| 3,612,658 | 10/1971 | Slaymaker | 350/162 SF |

OTHER PUBLICATIONS

IEEE Transactions on Antennas and Prop., vol. AP-21, No. 5, Sep. 1973, D. E. Weissman, "Two Frequency Radar Interferometry Applied to ...Ocean Wave Height".
Conference Proceedings-3rd National Convention on Military Electronics, Jun. 1959, Cutrona et al., "Data Processing by Optical Techniques".
Proceedings of the IEEE, vol. 54, No. 8, Aug. 1968, L. J. Cutrona et al., "On the Application of Coherent Optical Processing Techniques to Synthetic-Aperture Radar".

Primary Examiner—Maynard R. Wilbur
Assistant Examiner—Lawrence Goodwin
Attorney, Agent, or Firm—Monte F. Mott; John R. Manning; Paul F. McCaul

[57] ABSTRACT

Apparatus for obtaining significant height information of ocean waves, or peaks of rough terrain utilizing means for compressing the radar signal over different widths of the available chirp or Doppler bandwidths, and means for cross-correlating one of these images with each of the others, where the center frequencies of the images have a spacing $\Delta f_{rO}$. Upon plotting a fixed (e.g., zero) component of the cross-correlation values $R^E(\Delta f_{rO})$ as the spacing is increased over some empirically determined range, such as 0 to 1 MHz, the system is calibrated. Thereafter to measure height with the system, a spacing value is selected and a cross-correlation value is determined between two intensity images at a selected frequency spacing, such as 0.1 MHz. The measured height is the slope of the cross-correlation value determined to the spacing value used. Both electronic and optical radar signal data compressors and cross-correlations are disclosed for implementation of the system.

5 Claims, 7 Drawing Figures

SURFACE ROUGHNESS MEASURING SYSTEM

ORIGIN OF INVENTION

The invention described herein was made in the performance of work under a NASA contract and is subject to the provisions of Section 305 of the National Aeronautics and Space Act of 1958, Public Law 85-568 (72 Stat. 435; U.S.C. 2457).

BACKGROUND OF THE INVENTION

This invention relates to novel apparatus for measuring heights of peaks above an arbitrary level by statistical means not limited to roughness or minimum area, and more particularly to a synthetic-aperture radar system for measuring the average height of terrain peaks or ocean waves.

Much work has been done on the remote measurement of ocean wave heights using nonimaging radar, and a review of such techniques is presented by D. E. Barrick, Remote Sensing of Sea State by Radar, *Remote Sensing of the Troposphere*, edited by V. E. Derr, Ch. 12, U.S. Government Printing Office, Washington, D.C., 1972. G. T. Ruck, D. E. Barrick, and T. Kaliszewski, *Bistatic Radar Sea State Monitoring*, Battelle Columbus Laboratories, Columbus, Ohio, Rep. 1388-19, 1971, have analyzed the possibility of using two-frequency radar interferometry for measuring wave slopes, and Weissman, et al. have demonstrated the operation of a radar system utilizing this technique both in laboratory wave tank measurements and flights over the Caribbean, [D. E. Weissman, Two Frequency Radar Interferometry Applied to the Measurement of Ocean Wave Height, *IEEE Trans. on Ant. and Prop.*, AP-21, 649=656, 1973; D. E. Weissman, C. T. Swift, W. L. Jones, Jr., J. W. Johnson, W. L. Grantham, J. A. Howell, J. C. Fedors, and J. J. Davis, A Dual Frequency Radar for Ocean Roughness Sampling, URSI Fall Meeting, Boulder, Colorado, 1974.] The possibility of measuring ocean wave heights by studying the return from a short-pulse radar has also been demonstrated by B. D. Zamarayev and A. I. Kalmykov, On the Possibility of Determining the Spatial Structure of an Agitated Ocean Wave by Means of Radar, *Izvestia, USSR Academy of Sciences — Atmospheric and Ocean Physics*, 5, 64-66, 1969, and by D. L. Hammone, R. A. Manella and E. J. Walsh, Short Pulse Radar Used to Measure Significant Wave Height and Surface Wind Speed, *URSI Fall Meeting*, Boulder, Colorado, 1975.

The principal concept involved in the wave height measurement, which is common to the interferometric techniques utilizing radar sensors, is that the resultant intensity for the electric field scattered from the ocean wave at some arbitrary point in space changes as the wavelength or angle of illumination for the electromagnetic radiation varies. This variation is dependent on the height difference between the crest and trough of the wave, and a measurement of the rate of this variation provides an indication of the ocean wave height. This principle has been used before in the design and operation of the tellurometer for the precise determination of range differences, [T. L. Wadley, Electronic Principles of the Tellurometer, *Trans. South African Inst. Electr. Engrs.*, 49, 143-161, 1958.] The various radar techniques for measuring ocean wave heights differ in the handling of the radar data, which is governed by the constraints set by the particular radar instrument being used, the accuracy and spatial resolution of the measurement being related to the bandwidth and the resolution of the radar system involved.

An extensive theoretical and experimental treatment of the utilization of this concept to measure the height of surface features within a resolution cell in images obtained by a tunable dye laser has been performed by Jain, the present inventor [A. Jain, *A Wavelength Diversity Technique for Smoothing of Speckle*, Ph.D. Thesis, California Institute of Technology, Pasadena, California, 1975], [N. George and A. Jain, "Space and Wavelength Dependence of Speckle Intensity," *Appl. Phys.*, 4, 201-212, 1974], and [George, et al., "Experiments on the Space and Wavelength Dependence of Speckle," *Appl. Phys.*, 1, 157, 1975]. The surface heights obtained by varying the wavelength can be determined quite accurately to the order of a wavelength, the accuracy improving with greater heights.

While the wavelengths of the ocean waves can be determined by inspection of the radar imagery or by obtaining its Fourier transform [W. E. Brown, Jr., C. Elachi, and T. W. Thompson, "Radar Imaging of Ocean Surface Patterns," *J. Geophys. Res.*, Vol. 81, No. 15, pp. 2657 (May 1976); C. Elachi, "Two Dimensional Wavelength Spectrum of Swells Across the North Atlantic," *J. Geophys. Res.*, (in press)], it is also of considerable interest to measure the heights of the ocean waves. A method of processing the images obtained by synthetic aperture radar to determine the heights of ocean waves at localized areas of interest in the images, and experimental results demonstrating this technique are presented.

SUMMARY OF THE INVENTION

In accordance with the invention, significant height information is obtained (of peaks in a rough terrain or heights of ocean waves) from a synthetic-aperture radar signal, $S(t)$, by means for compressing the radar signal for intensity images $I_1(x), I_2(x) \ldots I_n(x)$ over different frequency spacings, $\Delta f_{r0}$, of the available chirp or Doppler bandwidths, means for cross-correlating these intensity images over a selected area and means for determining the value of a given (e.g., zero) component of this cross-correlation as a function of the spacing $\Delta f_{r0}$ of the center frequencies, $\Delta f_{r0}$, for the cross-correlated images as a direct indication of height. In a digital processor, the data compression means is comprised of a plurality of match filters of predetermined width, $\Delta f_r$, each followed by a squarer to provide the intensity images $I_1(x), I_2(x) \ldots I_n(x)$ which are cross-correlated over selected areas in the $x$ dimension of the image to obtain the values $\int I_1(x) I_k(x) dx$ for $k$ selected from the sequence $1, 2, \ldots n$. The cross-correlation value for $k = 1$ yields a normalizing factor that may be used in subsequent cross-correlations for $k = 2, 3 \ldots n$. In an optical processor the data compression means is comprised of a data film on which the radar signal has been recorded, and a tilted plane correlator to produce on a map film the intensity images $I_1(x), I_2(x) \ldots I_n(x)$ for different frequency spacings, $\Delta f_{r0}$. The cross-correlating means is then comprised of optical means for superimposing a selected area of an intensity image on a map film at one plane onto a corresponding area selected in the intensity images to be cross-correlated on a duplicate map film in another plane, and illuminating the superimposed areas with coherent light, and means for focusing the light transmitted through the superimposed and selected areas onto an intensity detector on a third plane. In either case, the apparatus thus includes means for compressing synthetic-aperture radar data over different sections of the available chirp or Doppler bandwidths to obtain intensity images, and means for cross-correlating these images to obtain height data. This height data for a predetermined range of frequency spacing, $\Delta f_{r0}$, is plotted to calibrate the system. Once calibrated, only two intensity images need be cross-correlated at a predetermined spacing to determine height directly.

DESCRIPTION OF PREFERRED EMBODIMENTS

Although reference will hereafter be made to the ocean surface in determining its roughness (wave height), it will be apparent that the same techniques may be employed to determine the roughness (peak heights) of land surface. As noted hereinbefore, the use of synthetic aperture imaging radars in oceanography has recently attracted considerable interest (W. E. Brown, Jr., C. Elachi and T. W. Thompson, Oceanographic Observation with Imaging Radar, *URSI Fall Meeting*, Boulder, Colorado, 1973; L. I. Moskowitz, "The Feasibility of Ocean Current Mapping vis. Synthetic Aperture Radar Methods," Proc. Fall Conv. Amer. Soc. Photogrammetry, 760–771, Oct. 1973; T. R. Larson and J. W. Wright, "Imaging Ocean Current Gradients with Synthetic Aperture Radar," *URSI Fall Meeting*, Boulder, Colorado, 1974). The radar generates a two-dimensional high resolution image of the ocean surface. The relation between the image brightness distribution and the properties of the surface is still not well understood; however three models (or any combination of them) seem to be the most popular: 1. The image represents the modulation of the small scale surface roughness. This modulation could result from the presence of a swell, internal wave, local wind, slicks, . . . . 2. The image represents the modulation of the local surface slope due to the presence of a large wave or ship wake. 3. The image is a result of the modulation of the water velocity by a wave or a current. The last model, if correct, is inherent to synthetic aperture imaging radars, in contrast to real aperture imaging radars, because of the importance of the Doppler information in the generation of the high resolution image (A. W. Rihaczek, *Principles of High Resolution Radar*, McGraw Hill, N.Y., 1969; J. W. Goodman, *Introduction to Fourier Optics*, McGraw Hill, San Francisco, 1968; R. O. Harger, *Synthetic Aperture Radar Systems*, Academic Press, N.Y., 1970). Even though the formation of the image is not yet well understood, radar imagery does show a large variety of ocean surface phenomena which, in most cases, have been verified with ground truth measurements: large gravity waves, internal waves, currents, ship wakes, island wind shadows, surface slicks, weather fronts and others. It should be mentioned that the uniqueness of the synthetic aperture imaging radar is that it provides high resolution imagery (tenths of meters) regardless of weather conditions, cloud coverage, sun illumination and platform altitude (even from orbiting spacecrafts).

The radar image of long ocean waves provides two-dimensional patterns and therefore the wavelength of these waves. But an important parameter of these waves is their height. The system of the present invention shown schematically in the block diagram of FIG. 1 can be used to derive the wave height from the radar image by measuring the rate of change of the speckle pattern in the synthetic aperture radar image as a function of the radar frequency.

A somewhat similar technique has also been used by D. Weisman, "Two Frequency Radar Interferometry Applied to the Measurement of Ocean Wave Height," IEEE Trans. on Ant. and Prop., AP-21, 649–656 (1973) to derive ocean wave height along a flight line using a two-frequency correlation radar technique.

In the art of radar imagery, a speckle pattern is defined as the pattern which results from the interferometric addition of the echoes generated when a coherent electromagnetic wave is scattered from a rough surface. This pattern is familiar to people who observe surfaces using coherent laser light. (This frequency diversity technique has been extensively used in the field of coherent optics to determine surface roughness.) If the surface is smooth there is no speckling. If the surface is slightly rough speckling appears. Then, a change in the electromagnetic wave frequency results in a change of the speckle pattern due to the change in the phase relationships for the electromagnetic field scattered across the rough surface, the magnitude of this change increasing with the height variation on the surface. A detailed statistical analysis gives the resulting value for the cross correlation of the radar images of such a surface at the two different frequencies separated by $\Delta \nu$, as $$\{I(\nu) I(\nu + \Delta\nu)\} - \{I(\nu)\}^2 \simeq_e - \left(\frac{4\pi \Delta\nu}{c} h_o\right)^2 f$$

where { } denotes the average value, and $I(\nu)$ is the intensity distribution in the image formed at frequency $\nu$, $c$ the velocity of light, $h_o$ the rms height variation on the surface and $f$ a factor depending upon the process used to obtain the imagery and the cross correlation, i.e., film nonlinearities, changes from signal film to image film, image negative to image positive, etc.

Figure 1A:
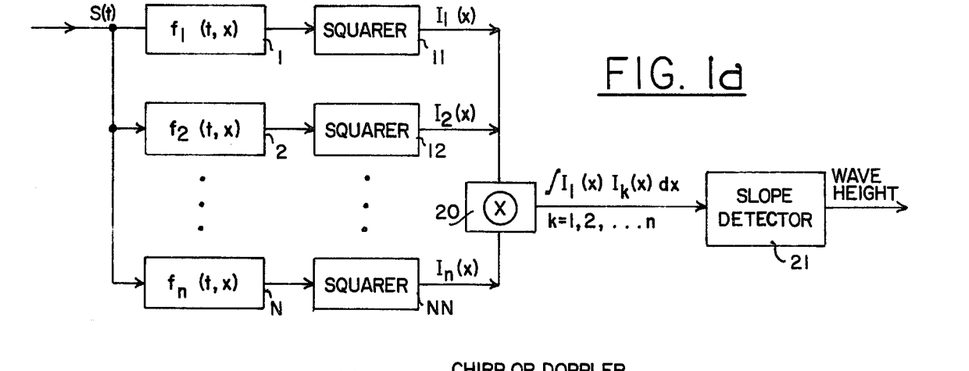
FIGS. 1(a) and 1(b) show a system diagram for a height processor in which a synthetic-aperture radar signal S(t) is compressed by matched filters $f_1(t,x), f_2(t,x) \ldots f_n(t,x)$, corresponding to a processing bandwidth of $\Delta f_r$ and at chirp or Doppler processing frequencies $f_{r01}, f_{r02} \ldots f_{r0n}$, respectively, the square of these outputs cross-correlated by the operation x, and the slope of the resulting curve measured to provide the height data.
Figure 1B:
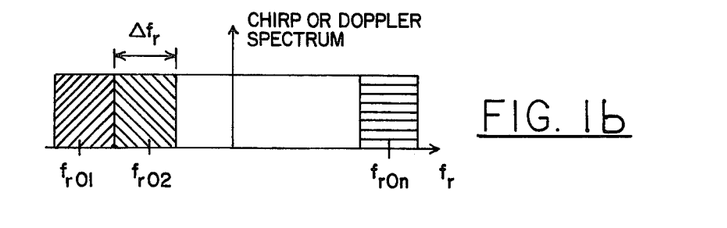
Figure 2A:
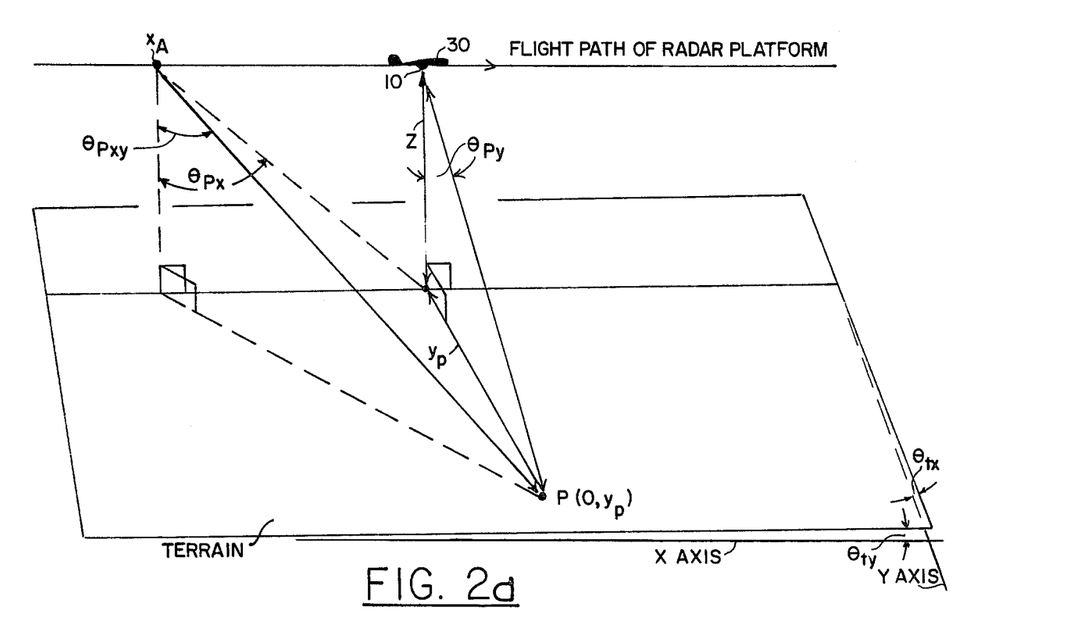
FIGS. 2(a) and 2(b) show radar imaging geometry useful in understanding the theory of the present invention.
Figure 2B:
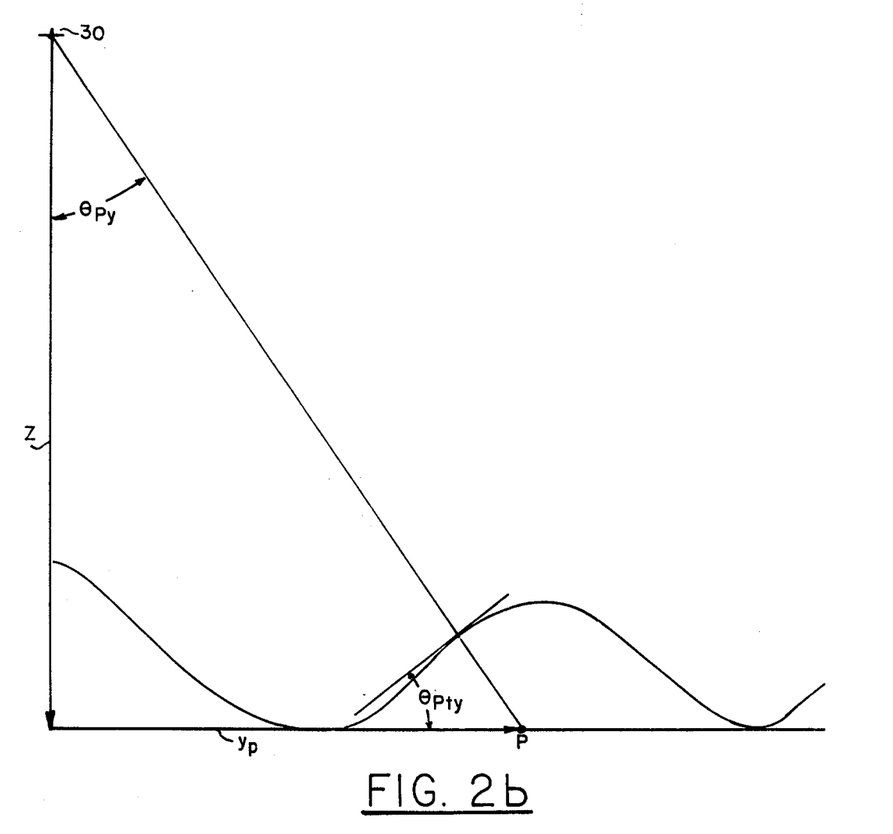

To implement the principle of above equation with side-looking synthetic aperture imaging radar 10 shown in FIGS. 2a and 2b, the radar may have a chirped signal with frequency ranging from 1200 MHz to 1210 MHz. The echo is recorded on a data film S which may then be optically processed to generate map films as will be described with reference to FIG. 3 for use in an optical correlator shown in FIG. 4. Alternatively, the echo signal S(t) may be processed digitally to obtain wave height data as shown in FIG. 1.

The principle involved in the ocean wave height measurement using side-looking (or forward-looking) synthetic-aperture imaging radar is that the resultant intensity for the electric field scattered from a rough surface at some arbitrary point in space changes as the wavelength or angle of illumination for the electromagnetic radiation varies. This variation is dependent on the height difference between the crest and trough of the wave, and a measurement of the rate of this variation provides an indication of the ocean wave height (or height of peaks in rough terrain).

Figure 3:
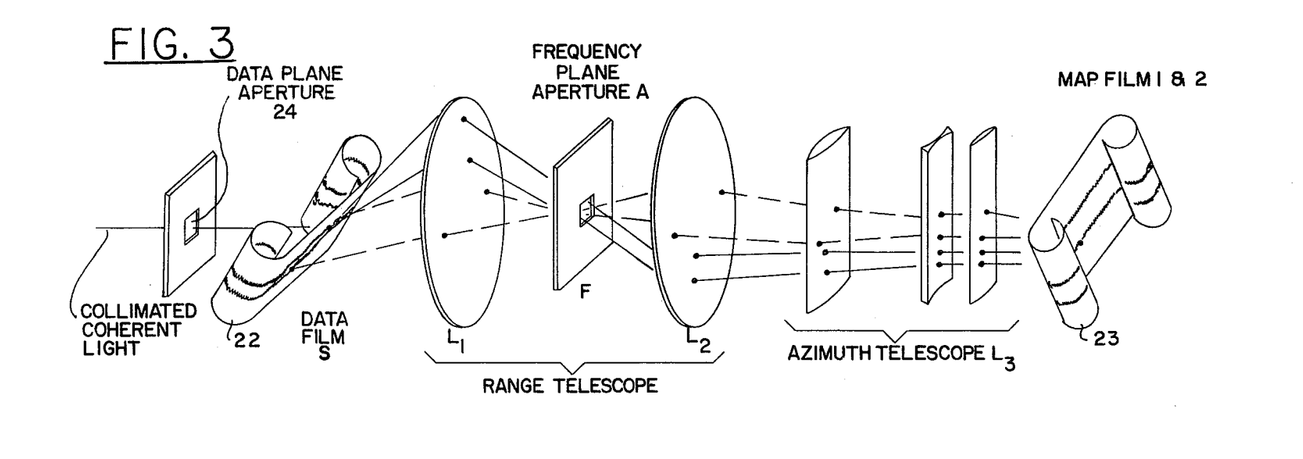
FIG. 3 illustrates the configuration of a tilted plane optical processor, for compressing into a map film the radar signal from a data film, the bandwidth of the chirp or Doppler spectrum being controlled by the size of aperture A of a frequency plane filter F, and the center frequency being controlled by the position of aperture A.

The essential elements in the processing of the synthetic-aperture radar data for obtaining significant wave height information are shown in FIG. 1(a). They involve compressing the radar data signal S(t) for ocean images over different sections of the available chirp or Doppler bandwidths $f_{r01}, f_{r02}, \ldots f_{r0n}$, cross-correlating these images and plotting the zero component of this cross-correlation value as a function of the spacings of the center frequencies for the bandwidths. A measure of the value of this curve for a given frequency spacing, $\Delta f_r$, would provide a direct indication of the ocean wave heights. This cross-correlation function, which is the output of the radar wave height processor shown in FIG. 1(a) is equal to the square of the product of the characteristic function of the ocean wave heights and the pupil function used in the chirp spectrum aperture for processing the radar signal. The intermediate calculation of the image produced by the radar system, will take into account the effect of the orbital velocity of the waves when the optical system of FIG. 3 is used with the optical correlator of FIG. 4. A detailed treatment of this effect will be discussed hereinafter. Thus, a knowledge of the chirp spectrum pupil function of the radar, and an experimental determination of the cross-correlation curve by the wave height processor, leads directly to a measurement of the ocean wave height distribution. It has been found that the measured cross-correlation curve is equal to $\Gamma_r(\Delta f_{r0}) \exp(-0.12\Delta f_{r0}\sigma_H)$, where $\sigma_H$ is the significant wave height, $\Delta f_{r0}$ the frequency separation for the cross-correlation value, and $\Gamma_r(\Delta f_{r0})$ a number depending upon the chirp spectrum aperture function $\Gamma_r$ for the radar processor.

Referring now to the processor shown schematically in a functional block diagram in FIG. 1(a), a number of functional blocks 1, 2 . . . N receive the chirp return signal S(t) and split it into n frequency channels, each of a predetermined width, $\Delta f_r$, of about 2 MHz. In practice, digital bandwidth filters may be used to provide the n frequency channels for electronic data processing, but in the preferred embodiment to be described with reference to FIGS. 3 and 4, optical filtering techniques are used. Outputs from the functional blocks 1 through N are individually squared in circuits 11, 12 . . . NN to change the electric field signals to intensity signals $I_1(x)$, $I_2(x) \ldots I_n(x)$. These signals are cross correlated in pairs by a circuit 20 and integrated. A slope detector 21, calibrated in heights, detects the drop-off (width) of the resulting integrated signal to provide as a system output a direct measurement in height. This technique for height determination is based on the fact that the synthetic aperture radar is an imaging instrument, where the resolution is determined by the chirp and doppler bandwidths used for the radar system. Thus, any point on the image contains contributions from the field scattered by an area of the terrain determined by the resolution cell size of the radar. By narrowing the effective doppler or chirp bandwidth utilized by the instrument, the area of the ocean surface contributing to the intensity at a given image point may be widened to any desired magnitude. The total path length that the radar wave has to travel to the image is different for the trough of the wave than for the crest, and the resultant phase difference for the contribution from these two regions of the wave is dependent on the frequency or angle of illumination of the wave. As this frequency or angle of illumination is varied, the fluctuation of the intensity at the image point, which receives contributions from both wave regions, is related to the difference in heights between the crest and trough of the wave, modified by the effect due to the resolution cell size of the radar. By measuring the effective rate of this fluctuation, one can infer the heights (of the ocean waves or of peaks in a rough terrain).

Before processing with a more detailed description of wave (or peak) height determination, the optical system shown in FIGS. 3 and 4 will be described. It has been used with an L-band synthetic aperture imaging radar operating at 25 cm wavelength, with a phased array antenna 75 cm long, 25 cm wide, and 5 cm thick to obtain a range beamwidth of 90°, centered 45° off vertical and an azimuth beamwidth of 18°, centered on zero doppler. The transmitted peak power is 7 kW, the pulse repetition frequency 1 kHz, the radar platform velocity 250 m/sec, the pulsewidth 1.25 μsec, and the total chirp spectrum bandwidth 10 mHz. The data are recorded optically on a film, shown as a data film 22 in FIG. 3 using a dual-channel recorder, such as the Goodyear 102, dual-channel recorder, and processed optically to convert the signal film into imagery with a resolution of 20 m range (45°) and 10 m along track. Once the data film is developed, it is employed in a tilted plane correlator (TPC) shown schematically in FIG. 3. The data film 22 is illuminated by the output of a HeNe laser (not shown) after it has passed through a spatial filter-collimating lens system. A Fourier transform lens $L_1$, a frequency plane aperture filter F, and an imaging lens $L_2$ convert the range data into the range image at a plane on a map film 23. A cylindrical azimuth telescope $L_3$ has the function of bringing the azimuth data at plane I to an alongtrack image focus on the map film 23. By controlling the position of a data plane aperture 24 and the spatial position of the frequency plane aperture filter F, the chirp frequency and the center bandwidth can be controlled. By setting the value of the frequency plane aperture at a given range bandwidth, the same strip of signal film can be processed for different center frequencies to provide the required images by positioning the location of the frequency plane aperture at the corresponding spatial coordinate in the range dimension. In that manner, the radar return signal recorded on the data film from a synthetic aperture radar in an aircraft 30 (FIG. 2a) is processed by the TCP for different chirp bandwidths $f_{r01}, f_{r02} \ldots f_{r0n}$ of predetermined width (e.g., 2 MHz) to provide on the map film 23 a record of the split radar signal equivalent to that of the different channels 1, 2 . . . n in FIG. 1(a). The map film itself functions as a squarer.

Figure 4:
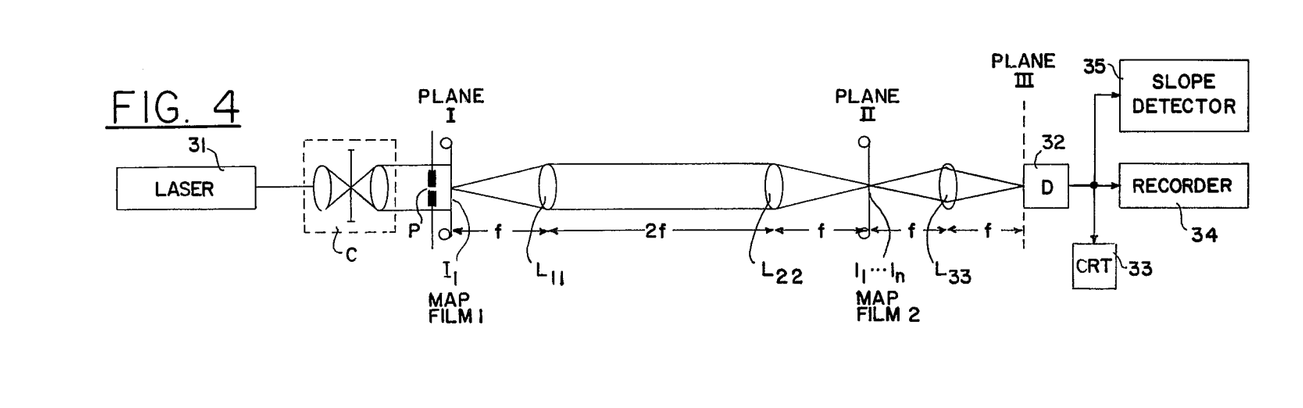
FIG. 4 illustrates the configuration of an optical cross-correlator in which the pupil P limits the area of a map film $I_1$ at plane I illuminated by a laser L and collimator C, and lenses $L_{11}$ and $L_{22}$ of focal lengths $f$(30.5 cm each) image $I_1$, onto plane II. The lens $L_3$ of focal length $f$, Fourier transforms the product $I_1L_2$ onto plane III, where the total power is detected by detector D.

The optical setup used to cross correlate pairs of images of the same area, but obtained for different chirp spectrum center frequencies, is shown in FIG. 4. An argon-ion laser 31, combined with a spatial filter collimator system, C, is used to illuminate the film image $I_1(x, y, f_{r0})$ processed for the particular chirp spectrum frequency $f_{r0}$ and the bandwidth $f_r$. The two Fourier transform lenses $L_{11}$ and $L_{22}$, each of focal length $f$, are used to provide unity magnification of an image at plane I onto plane II, where the transparency of transmissivity $I_2(x + \Delta x, y + \Delta y, f_{r0} + \Delta f_{r0})$ is situated, which is the image of the same area as $I_1(x, y, f_{r0})$ but processed at the chirp spectrum frequency $f_{r0} + \Delta f_{r0}$ and shifted by ($\Delta x$, $\Delta y$) in the X- and y-directions for the optical system. The distance between $L_{11}$ and $L_{22}$ is $2f$, and between plane I and $L_{11}$ and plane II and $L_{22}$ is $f$, so that no phase effects are introduced by the imaging process. The spatial distribution of the electric field at the exit of plane II is proportional to $I_1(x, y, f_{r0})I_2(x + \Delta x, y + \Delta y, f_{r0} + \Delta f_{r0})$, and this is Fourier transformed by a lens $L_{33}$ of focal length $f$ onto plane III. The power incident on plane III is measured by a photodetector 32 whose aperture is large enough to collect all the Fourier components involved. Using Parseval's theorem, and assuming a unit amplitude illumination at $I_1$, the power measured by the detector is $$W_{\Delta f_r}(\Delta f_{r0}, \Delta x, \Delta y) = \iint_{-\infty}^{\infty} |I_1(x,y,f_{r0})I_2(x+\Delta x, y+\Delta y, f_{r0}+\Delta f_{r0})|^2 dxdy$$

where $\Delta f_r$ is the bandwidth at which $I_1$ and $I_2$ were processed, ($\Delta x$, $\Delta y$) are relative shifts of $I_1$ with respect to $I_2$, and $f_{r0}$, $f_{r0} + \Delta f_{r0}$ are the two processing frequencies involved. For the purposes of wave height measurement, $\Delta x$ and $\Delta y$ would be equated to zero and the function $W_{\Delta fr}(\Delta f_{r0}, 0, 0)$ plotted as a function of $\Delta f_{r0}$. In considering $I_1$ and $I_2$ to be the two images of the ocean wave, we have assumed that the film nonlinearities of the image film can be ignored and have factored out the gamma of the film. The result is displayed using a CRT 33 or recorder 34, and a slope detector 35 provides a direct indication of ocean wave height after the system has been calibrated.

As noted hereinbefore, as the frequency or angle of illumination is varied, the fluctuation of the intensity of the image point, which receives contributions from both wave regions is related to the difference in heights between the crest and trough of the wave, modified by the effect due to the resolution. A detailed discussion will now follow on the theory by which heights, of ocean waves or peaks of rough terrain, can be inferred from measurements of the effective rate of this fluctuation.

In the linear system idealization for the synthetic aperture radar performance [*Radar Handbook*, ed. Merrill I. Skolnik, Chap. 23 (by L. J. Cutrona), New York, 1970] the electric field $e(x_0, y_0)$ in the image of the radar output is $$e(x_0, y_0) = \iint_{-\infty}^{\infty} \psi(x_0, y_0; x, y)g(x, y)dxdy \quad (1)$$

wherein $\psi(x_0, y_0; x, y)$ is the generalized ambiguity function as defined by Cutrona [ibid.] for the radar and $g(x, y)$ is the terrain reflectivity.

In the calculation for the ambiguity function, however, it is assumed that the terrain reflectivity does not depend upon the wavelength of illumination or the look angle of the radar. In the case of an uneven surface, this assumption is not applicable, and it is necessary to consider the effects of the wavelength and angular dependence of the radiation scattered by the surface. In order to take this phenomenon into account, calculate the image field for each wavelength component of the chirp spectrum and position of the radar platform and integrate this electric field over the total synthetic antenna length and the chirp spectrum bandwidth available.

The impulse response function for the radar imaging system for a given value of the antenna position, $x_A$, and the chirp spectrum frequency, $f_r$, may be expressed as a convolution of the generalized ambiguity function with the Fourier transform of the pupil function for this range and Doppler aperture. This aperture is the Diarc delta function $\delta(f_{dd} - f_d)\delta(f_{rr} - f_r)$, where the phase factor due to he time delay, $f_d$, is equal to $x_A f_{r0}/Z$, $f_{r0}$ being the frequency of operation of the radar and $Z$ the height of the radar platform from the terrain. While the Doppler shift of the return signal is $f_d v_r/c$, for $v_r$ the aircraft velocity and $c = 3 \times 10^8$ m/sec, it is the quantity $f_d$ that is significant in the matched filter processing of the radar correlator. The Fourier transform of this delta function is defined by $$U(x, y_0) = \iint_{-\infty}^{\infty} \delta(f_{dd} - f_d)\delta(f_{rr} - f_r)\exp\left[\frac{-i2\pi}{c}(f_{dd}x + f_{rr}y_0)\right]df_{dd}df_{rr} \quad (2)$$

the symbol $y_0$ being used to specify the particular nature of the chirp processing operation.

The resultant impulse response of the radar system for these particular frequencies $(f_d, f_r)$ is given by the convolution of the impulse response $U(x, y_0)$ with the generalized ambiguity function $\psi(x, y)$. Thus, for the complex terrain reflectivity $g(x, y)$, the electric field recorded in the radar image is the convolution of $g(x, y)$ with the convolution of $\psi(x, y)$ with $U(x, y_0)$. Further, for the Doppler spectrum aperture function given by $\Gamma_d(f_d - f_{d0})$, which has an effective width of $\Delta f_d$ and is centered at $f_{d0}$, and a chirp spectrum aperture function $\Gamma_r(f_r - f_{r0})$ of width $\Delta f_r$ centered at the radar frequency $f_{r0}$, the electric field in the radar image is the superposition of fields obtained for each Doppler and chirp frequency component weighted by the functions $\Gamma_d(f_d - f_{d0})$, $\Gamma_r(f_r - f_{r0})$. This yields the equation $$e(x_0, y_0) = \iint_{-\infty}^{\infty} \left\{ g(x, y) * \psi(x, y) * \exp\left[\frac{i2\pi}{c}(f_d x + f_r y_0)\right] \right\} \times \Gamma_d(f_d - f_{d0})\Gamma_r(f_r - f_{r0})df_d df_r \quad (3)$$

where * denotes the convolution operation. Eq. (3) describes the field in the image plane of the terrain reflectivity $g(x, y)$ obtained by a synthetic aperture radar defined by the generalized ambiguity function $\psi(x, y)$ and the processing Doppler and chirp spectrum apertures $\Gamma_d(f_d - f_{d0})$, $\Gamma_r(f_r - f_{r0})$. Since the azimuth aperture for the synthetic aperture radar processor is generally symmetric, it is safe to consider the value of $f_{d0}$ to be zero in our further evaluation of Eq. (3).

From the geometry of FIG. 2a the terrain reflectivity function $g_P(x, y)$ for a particular area surrounding the point P located at $(0, y_p)$ is:

$$g_P(x, y) = R(x, y) \exp\left[\frac{i4\pi}{c} f_r \cos\theta_{P_{xy}} h(x, y)\right] \exp\left\{\frac{i2\pi}{c} \times f_r[x \sin(\theta_{P_x} - 2\theta_{P_{tx}}) + y \sin(\theta_{P_y} - 2\theta_{P_{ty}})]\right\} \quad (4)$$

$R(x, y)$ is the amplitude reflectivity of the terrain due to absorption and dielectric constant variations and $h(x, y)$ is the profile of the terrain resting on the local slopes of angles $(\theta_{P_{tx}}, \theta_{P_{ty}})$ shown in FIG. 2b for the radar platform and terrain of FIG. 2a which vary slowly compared to the variation of $h(x, y)$. The slope angles $\theta_{P_{tx}}$ and $\theta_{P_{ty}}$ are a function of both the slope angles $(\theta_{P_x}, \theta_{P_y})$ of the side-looking radar and the tilt $(t)$ of the terrain which, for an ocean wave, is the angle between a tangent to the ocean wave and a horizontal X-Y plane. FIG. 2b illustrates the geometry of the angle $\theta_{P_{ty}}$ measured in the Y-Z plane and FIG. 2c illustrates the geometry of the angle $\theta_{P_{tx}}$ measured in the X-Z plane. Note that in FIG. 2a there is a slight tilt $(\theta_{tx}, \theta_{ty})$ of the terrain with respect to the X and Y axes of the horizontal X-Y plane, to illustrate a typical case in which the roughness of the terrain is the major factor in the tilt angles $\theta_{P_{ty}}$, $\theta_{P_{tx}}$. The distance of point P from the radar, $\sqrt{Z^2 + y_p^2}$, is considered to be large, so that the radar wave incident on the area surrounding P is essentially plane and is at angles $(\theta_{P_x}, \theta_{P_y})$ with respect to the normal to the horizontal plane. The function $\exp[(i4\pi/c)f_r\cos\theta_{P_{xy}}h(x, y)]$ is the phase modulation in the reflected wave due to the small-scale roughness $h(x, y)$. The factor $$\exp\left\{\frac{i2\pi}{c} f_r[x \sin(\theta_{P_x} - 2\theta_{P_{tx}}) + y \sin(\theta_{P_y} - 2\theta_{P_{ty}})]\right\}$$

is the phase modulation in the reflected wave from the tilt variations of the ocean wave and the angles of incidence $\theta_{P_x}$ and $\theta_{P_y}$ of the radar wave and is determined from equating the angle of incidence to the angle of reflection from the surface. The angle $\theta_{P_x}$ is generally small, and for a typical spacecraft radar it is less than 0.1 radian. $(\theta_{P_{tx}}, \theta_{P_{ty}})$ are the angles of tilt of an ocean wave when $g_P(x, y)$ is an ocean surface and are generally limited to be less than 0.143. Thus, in further computations involving $g_P(x, y)$ it is reasonable to consider $\sin(\theta_{P_x} - 2\theta_{P_{tx}})$ as approximately equal to $(\sin\theta_{P_x} - \sin 2\theta_{P_{tx}})$. Since $\sin\theta_{P_x}$ is equal to $x_A/Z$, $f_{r0}\sin\theta_{P_x}$ is the Doppler frequency $f_d$, and $\theta_{P_y}$ is generally much larger than $\theta_{P_{ty}}$ for side-looking radars.

To evaluate the radar performance for a given reflectivity, substitute Eq. (4) into Eq. (3). For $h(x, y) = \theta_{P_{tx}} = \theta_{P_{ty}} = 0$, which corresponds to an even terrain of reflectivity $R(x, y)$, the image electric field is found to be $$e\left(\frac{2x_0}{c}, \frac{y_0 \sin\theta_{P_y}}{c}\right) = \quad (5)$$

-continued $$\psi\left(\frac{2x}{c}, \frac{y \sin\theta_{P_y}}{c}\right) * \left[ R(x, y) * \exp\left(\frac{-i2\pi}{c} f_{r0} y \sin\theta_{P_y}\right) \right.$$
$$\left. \times \gamma_d\left(\frac{2x}{c}\right) \gamma_r\left(\frac{y \sin\theta_{P_y}}{c}\right)\right]$$

where $$\gamma_d(x) = \int_{-\infty}^{\infty} \Gamma_d(f_d) \exp(-i2\pi f_d x) \, df_d$$

and $$\gamma_r(y) = \int_{-\infty}^{\infty} \Gamma_r(f_r) \exp(-i2\pi f_r y) \, df_r$$

Eq. (5) neglects the variation of $x \sin\theta_{P_x}$ in comparison to $y \sin\theta_{P_y}$, which is a much larger term, in the function $\gamma_r(y)$. For infinite processing bandwidths, given by the widths of $\Gamma_r(f_r)$, $\Gamma_d(f_d)$, the functions $\Gamma_r(x)$, $\gamma_d(y)$ reduce to delta functions, and Eq. (5) reduces to Eq. (1).

On the other hand, for a radar with an infinitely high resolution, when $\psi(x, y)$ would be a delta function, the image electric field would be the convolution of the reflectivity with the impulse response functions $\Gamma_d$ and $\Gamma_r$, and the image resolution would be determined primarily by the bandwidths utilized by the radar processor. In general, the resolution of the radar is indeed limited by the data handling capabilities of the processor, and so it is safe to assume, for further analysis, that the generalized ambiguity function is the delta function.

Consider the case of an uneven surface, such as ocean waves, and assume that the function $R(x, y)$ is unity in Eq. (4). We describe $h(x, y)$ as a series of steps whose perimeters are defined by the functions $S_{ij}(x - x_i, y - y_j)$ centered at the various points $(x_i, y_j)$, and the profile of the surface within this $(ij)^{th}$ step is defined by the function $h_{ij}$. The effective length of the $S_{ij}$ function is given by $l_i$ in the x-direction and $l_j$ in the y-direction. Thus, the surface profile $h(x, y)$ can be written as $$\sum_{ij} h_{ij} S_{ij}(x - x_i, y - y_j).$$

For nonoverlapping $S_{ij}$, the exponential $\exp[(-i4\pi/c)\cos\theta_{P_{xy}}h(x, y)]$ can be rewritten and the resulting surface reflectivity can be written in the following form:

$$g_P(x,y) = \exp\left\{\frac{i4\pi}{c} f_r[x \sin(\theta_{P_x} - 2\theta_{P_{tx}}) + y \sin(\theta_{P_y} - 2\theta_{P_{ty}})]\right\} \quad (6)$$
$$\times \left\{1 + \sum_{ij} S_{ij}(x - x_i, y - y_j)\left(\exp\left[\frac{i4\pi}{c} f_r \cos\theta_{P_{xy}} h_{ij}\right] - 1\right)\right\}$$

The first term in Eq. (6) represents the field reflected if the terrain is perfectly flat with only tilt variations. The term identified by the summation consists of two terms, the first being the component of the reflected field due to the surface roughness, and the second being the component that must be subtracted from the field for the flat surface case to provide the reflected field for the smooth component of the terrain.

To obtain the electric field in the image of the field given by Eq. (6), substitute Eq. (6) in Eq. (3), neglect the effect of the variation of $f_d^2$ compared to $f_d$ in the term $\cos\theta_{P_{xy}}$ and assume that the scattering cross-section of the terrain, determined by the Fourier transforms of $S_{ij}(x - x_i, y - y_j)$ does not vary significantly with the Doppler chirp spectrum frequency variations over the bands used in the radar processor, as compared to the variations of the exponential phase terms containing this $(f_d, f_r)$ dependence. The resultant image electric field is $$e_P\left[\frac{2x}{c}, y\sin(\theta_{Py} - 2\theta_{Pty})\right] = \tag{7}$$

$$\left(\exp\left[\frac{-i2\pi}{c}f_{r0}y\sin(\theta_{Py} - 2\theta_{Pty})\right]\right.$$

$$\left.\gamma_d\left(\frac{2x}{c}\right)\gamma_r[y\sin(\theta_{Py} - 2\theta_{Pty})]\right\}$$

$$*\left[1 + \sum_{ij}\beta_{ij}F_{ij}(x, y; x_i, y_j; h_{ij})\right]$$

where $\beta_{ij}$ is the scattering cross-section factor and is equal to $$s_{ij}\left[\frac{-f_{r0}}{c}\sin 2\theta_{Ptx}, \frac{f_{r0}}{c}\sin(\theta_{Py} - 2\theta_{Pty})\right]$$

for $s_{ij}$ defined by $$s_{ij}(l,m) = \iint_{-\infty}^{\infty} S_{ij}(x,y)\exp[i2\pi(xl + ym)]\,dx\,dy.$$

In the approximation, where $S_{ij}(x, y)$ are given by the step functions $[\text{rect}(x/l_j)]$, the cross-section factor $s_{ij}$ is equal to $$l_i l_j \text{sinc}\left[\frac{f_{r0}}{c}l_i\sin 2\theta_{Ptx}\right]\text{sinc}\left[\frac{f_{r0}}{c}l_j\sin(\theta_{Py} - 2\theta_{Pty})\right]$$

The functions $\gamma_d(2x/c)$, $\gamma_r[y\sin(\theta_{Py} - 2\theta_{Pty})]$ are the same as those defined in Eq. (5) and, for the chirp and Doppler spectrum pupil functions, approximated by $$\Gamma_d(f_d) = \text{rect}\left(\frac{f_d}{\Delta f_d}\right) \text{ and } \Gamma_r(f_r) = \text{rect}\left(\frac{f_r}{\Delta f_r}\right),$$

these functions become $$\Delta f_d \text{sinc}\left[\frac{2\Delta f_d x}{\Delta f_d}\right]\Delta f_r \text{sinc}\left[\frac{\Delta f_r}{c}y\sin(\theta_{Py} - 2\theta_{Pty})\right].$$

The product $\gamma_d\gamma_r$ on the left-hand side of the convolution sign in Eq. (7) corresponds to the impulse response of the radar, and the resolution cell size is determined to be $2c/[\Delta f_r \sin(\theta_{Py} - 2\theta_{Pty})]$ in the range dimension and $c/\Delta f_d$ in the azimuth dimension, this being equal to the size of the radar antenna if the full Doppler aperture is used. The function $F_{ij}(x, y; x_i, y_j; h_{ij})$ describes the effect on the image field due to the phase variations in the scattered field arising from the unevenness of the terrain and is given by $$F_{ij}(x, y; x_i, y_j; h_{ij}) =$$

$$\delta(x - x_i)\left\{\delta\left[y - y_j + \frac{x_i\sin 2\theta_{Ptx} - h_{ij}\cos\theta_{P_0}}{\sin(\theta_{Py} - 2\theta_{Pty})}\right] - \right.$$

-continued $$\left.\delta\left[y - y_j + \frac{x_i\sin 2\theta_{Ptx}}{\sin(\theta_{Py} - 2\theta_{Pty})}\right]\right\}$$

where $\cos\theta_{P_0}$ is equal to the value of $\cos\theta_{Px}$ at the Doppler frequency $f_d$ equal to zero.

The scattering factor $\beta$ is dependent on the tilts of the ocean waves ($\theta_{Ptx}, \theta_{Pty}$) and also the distance away from nadir as determined by $\theta_{Py}$ and the size of the small scale roughness ($l_i, l_j$). A modulation in the wave tilt or roughness size would contribute to a modulation of the intensity in the image. A detailed analysis and experimental evaluation of the effect of tilt and roughness of the terrain on the image modulations for the radar system have been reported by Schaber, et al. [G. G. Schaber, G. L. Berlin, and W. E. Brown, Jr., *Geol. Soc. Amer. Bull.*, March 1975] for the case of desert images and by Elachi and Brown [C. Elachi and W. E. Brown, Jr., IEEE Trans. on Ant. and Prop., in press] for the case of ocean wave imaging.

While in principle, the synthetic antenna length is determined by the area illuminated by the radar, the actual length is modified by the finite angle over which the radiation is backscattered by the small-scale roughness. Since this angle is determined by the spatial lengths of these scatterers, a modulation in the size of the scatterers would also result in a modulation in the azimuth resolution of the radar if the scatterer sizes were larger than the size of the radar antenna.

Note that Eq. (7) does not include the effect of motions of the surface being imaged. Since $f_d$ is the time variable in Eq. (3), the effect of surface motions can be included by making $g(x, y)$ a function of $f_d$ as well. A uniform motion of $g(x, y)$ in the y-direction with a velocity $v_g$ can be included by substituting the function $g(x, y - \xi f_d)$ for $g(x, y)$ in Eq. (3). $\xi$ is equal to $Zv_g/f_{r0}v_r^2$, where $v_r$ is the velocity of the radar platform. A resulting evaluation provides no change in the image except for a uniform shift proportional to $\xi$ in the azimuth direction. A uniform motion in the x-direction is equivalent to a change in the equivalent velocity of the aircraft and thus a change in the focusing parameter for radar imagery.

At any one point on the ocean surface, the height varies according to the orbital velocity, and the cross-section of this point according to the ocean wave length. A patch of constant cross-section moves in the direction of the ocean wave propagation at the ocean wave velocity. Since the radar maps the time delay of the backscattered signal from a patch of constant cross-section, the ocean wave appears to it to be moving in a plane parallel to the radar platform motion and the orbital velocity effects are not important. However, an object of constant cross-section, such as a ship, resting at a particular point on the ocean, and moving vertically at the orbital velocity, will have a modified image and its image will generally be degraded in the azimuth direction. It should be pointed out that the synthetic aperture radar is sensitive to the variation of time delays of the signal scattered by a target, and the actual effect of the instantaneous shift in the frequency of the backscattered signal due to the orbital motion is included in this time delay variation which depends on the variation of position of the scattering patch. In such a consideration, the variation of the velocity and radar cross-section of this patch must also be taken into account, and approximating these quantities by a constant number during the integration time of the radar processor has in the past led to considerable confusion in the interpretation of the synthetic aperture radar ocean wave imagery. A dependence of the ocean wave tilt angle $\theta_{Ptx}$ on time would lead to a change in the resolution cell size of the radar, the result being a smaller resolution cell size if the tilt angle is increasing and a larger cell size if it is decreasing. This effect, however, would be very small for the normally occurring rates of change of the tilt. The random motion of the small-scale roughness would have negligible overall effect on the radar image since its main contribution is in the backscatter modulation function $\beta_{ij}$, a treatment of this negligible effect has been considered by Elachi and Evans [C. Elachi and D. E. Evans, *IEEE Trans. on Ant. and Prop.*, in press].

The ability to determine height of ocean waves, or peaks of a rough terrain, according to the invention derives from Eq. (7). For a particular point $P_1$ in the area of interest, the image electric field may be rewritten as $$e_{P_1}(x_{P_1}, y_{P_1}, f_{ro}) = \qquad (8)$$

$$\exp\left(\frac{i2\pi}{c} f_{ro} y_{P_1}\right) \times$$

$$\left\{\alpha + \sum_{ij}^{N} \beta_{ij} \exp\left[\frac{i2\pi}{c} f_{ro}(y_j \sin(\theta_{P_y} - 2\theta_{Pty_j}) - x_i \sin 2\theta_{Ptx_i})\right]\right.$$

$$\left.\times \left[\exp\left(\frac{i4\pi}{c} f_{ro} \cos \theta_{P_y0} h_{ij}\right) - 1\right]\right\}$$

where the finite size of $\gamma_r(y)$, $\gamma_d(x)$ limits the number of scatterers that contribute to the field at an image point. In this case, this number is given by the summation over the N scatterers; $\alpha$ is the uniform background level term and is the first term on the right-hand side of Eq. (7); $\beta$ is the scattering factor; and $(\theta_{Pty_j}, \theta_{Ptx_i})$ are the tilt angles at points $(x_i, y_j)$ which have been assumed to be slowly varying compared to the small-scale roughness $h(x, y)$. Assuming that the scatterers are densely packed [L. I. Goldfischer, *J. Opt. Soc. Am.*, 55, 247–253, 1965], N is equal to the resolution cell area divided by the area occupied by a scatterer, and this quantity can be approximated by $2c^2/(l_i l_j \Delta f_r \Delta f_d \sin \theta_{P_y})$ (neglecting the effect on the resolution cell size due to the small tilt angles, the scatterer size modulations, and the heights $h_{ij}$).

The small-scale roughness is usually less than the wavelength of the radar and the variation of $\exp[(i4\pi/c)f_{ro} \cos \theta_{P_y0} h_{ij}]$ with respect to $f_{ro}$ is negligibly small over the chirp spectrum bandwidth available. Also, since $\theta_{Pty_j}$ is a small number, it is permissible to approximate $\sin(\theta_{P_y} - 2\theta_{Pty_j})$ by $(\sin \theta_{P_y} - \cos \theta_{P_y} \sin 2\theta_{Pty_j})$. The term $\exp[(i2\pi/c)f_{ro} y_j \sin \theta_{P_y}]$ represents the variation of the phase of the radar wave incident at angle $\theta_{P_y}$ across the resolution cell size of the radar, and with respect to change in radar frequency, occurs in an interval equal to the chirp bandwidth of the radar processor. The factor $$\exp\left[\frac{-i2\pi}{c} f_{ro}(y_j \cos \theta_{P_y} \sin 2\theta_{Pty_j} + x_i \sin 2\theta_{Ptx_i})\right]$$

corresponds to the phase variation due to the variations in the tilt angles of the terrain. If the resolution cell is small enough so that the tilt of the waves does not change appreciably across its length, the decorrelation length due to the tilt in the range and azimuth directions is determined by $\Delta f_r/(2 \sin \theta_{Pty}) \times (\sin \theta_{P_y}/\cos \theta_{P_y})$ and $\Delta f_d/(4 \sin \theta_{Ptx})$, respectively. The composite decorrelation length would depend upon the sum of the slopes of the individual decorrelation curves for the resolution cell size and the tilts approximated by $$\frac{\Delta f_r}{1 + 2(\cos \theta_{P_y}/\sin \theta_{P_y}) \sin \theta_{Pty} + (4 \sin \theta_{Ptx})/\Delta f_d} .$$

The resolution cell size of the radar may be large enough to cover more than half an ocean wave, in which case the tilt angles $(\theta_{Ptx}, \theta_{Pty})$ cannot be assumed to be constant within a resolution cell of the radar, but it is possible to rewrite $(y_j \cos \theta_{P_y} \sin \theta_{Pty_j} + x_i \sin 2\theta_{Ptx_i})$ as $2H_{ij}$, corresponding to the height of the ocean wave. Due to the $\cos \theta_{P_y}$ term, the dependence of the resolution cell size on $\sin \theta_{P_y}$ and the tilt angle variations, the $H_{ij}$ as defined is not strictly the ocean wave height parameter, but for the purposes of the statistical analysis, it may be considered to be equivalent. Then calculate the cross-correlation for the image intensities processed for the two frequencies $f_{ro}$ and $(f_{ro} + \Delta f_{ro})$ and obtain the following result $$\left\langle I_{P_1}(f_{ro}) I_{P_1}(f_{ro} + \Delta f_{ro}) \right\rangle = [\alpha^4 + 4N\alpha^2\beta^2 + 2\beta^4 N(1 + 2N)] + \qquad (9a)$$

$$2\alpha^2\beta^2\eta_H\left(\frac{2\Delta f_{ro}}{c} \sigma_H\right)\left[\eta_h\left(\frac{2\Delta f_{ro}}{c} \sigma_h\right) + 1\right]\Gamma_r(\Delta f_{ro}) +$$

$$\beta^4(N^2 - N)\eta_H^2\left(\frac{2\Delta f_{ro}}{c} \sigma_H\right)\left[\eta_h\left(\frac{2\Delta f_{ro}}{c} \sigma_h\right) + 1\right]\Gamma_r^2(\Delta f_{ro})$$

The brackets $\langle \ \rangle$ denote the mean value operation. $\beta$ is the average value of $\beta_{ij}$ within the resolution cell and is the backscattering cross-section of the area of interest. N, the number of scatterers in a resolution cell, is approximately equal to $2c^2/(\Delta f_r \Delta f_d \sin \theta_{P_y} l_i l_j)$, where $l_i l_j$ are the sizes of the small-scale scatterers. $\sigma_H$ is the standard deviation of the ocean wave height function $H_{ij}$, and $\sigma_h$ is the standard deviation of the heights of the scattering waves. $\eta_H$ and $\eta_h$ are the characteristic functions for the probability density of the wave height $H_{ij}$ and the roughness $h_{ij}$ and, for a Gaussian distribution, are equal to $\exp\{-\frac{1}{2}[4\pi(\Delta f_{ro}/c) \sigma_H]^2\}$ and $\exp\{-\frac{1}{2}[4\pi(\Delta f_{ro}/c) \sigma_h]^2\}$, respectively. For the special case when the resolution cell size is smaller than an ocean wavelength, the characteristic function for the wave height $\theta_H$ in Eq. (9a) may be replaced by the characteristic function for the wave slopes equal to $$\eta_{\theta ty}(2\Delta f_{ro} \Delta y \cos \theta_{P_y} \sin \theta_{Pty}) \eta_{\theta tx}(2\Delta f_{ro} \Delta x \theta_{Ptx})$$

for $\Delta x$, $\Delta y$, the resolution cell sizes. For a Gaussian density function for the slopes, this function is equal to $$\exp\left(-\frac{1}{2}\left[4\pi\left(\frac{\Delta f_{ro}}{\Delta f_r}\right)\left(\frac{\cos \theta_{P_y}}{\sin \theta_{P_y}}\right)\sigma_{\theta t Y}\right]^2\right)$$

$$\exp\left(-\frac{1}{2}\left[4\pi\left(\frac{\Delta f_{ro}}{4\Delta f_d}\right)^2 \sigma_{\theta tx}\right]^2\right)$$

where $\sigma_{\theta ty}$, $\sigma_{\theta tx}$ are the standard deviations of the wave slopes in the y- and x-directions, respectively.

α, which corresponds to the specular reflection term, is negligibly small compared to β for the non-nadir angles and may be neglected in Eq. (9a). Further, N is a very large number, and the terms of order N can be neglected in comparison to the terms containing $N^2$. $\sigma_h$ is a small number compared to $\sigma_H$, and $\eta_h[2\Delta f_{r0}/c)\sigma_h]$ may be approximated by unity for the values of $\Delta f_{r0}$ involved with the radar chirp. The quantity $$\left\langle I_{P1}(f_{r0})I_{P1}(f_{r0} + \Delta f_{r0}) \right\rangle \frac{1}{4N^2\beta^7} - 1$$

is defined by $R(\Delta f_{r0})$ as the normalized cross-correlation function for the radar image. This quantity is simply a product of the square of the radar processor pupil function, $\Gamma_r^2(\Delta f_{r0})$, and the square of the characteristic function of the wave heights or the characteristic function for the wave slopes. This may be written as $$R(\Delta f_{r0}) \simeq \eta_H^2 \left( \frac{2\Delta f_{r0}}{c} \sigma_H \right) \Gamma_r^2 (\Delta f_{r0}) \quad (9b)$$

for the radar resolution cell much larger than an ocean wavelength, and $$R(\Delta f_{r0}) \simeq \eta_{\theta ty}^2 \left( \frac{2\Delta f_{r0}}{c} \Delta y \cos \theta_{Py} \sigma_{\theta Pty} \right) \quad (9c)$$

$$\eta_{\theta tx}^2 \left( \frac{2\Delta f_{r0}}{c} \Delta x \sigma_{\theta Ptx} \right) \Gamma_r^2 (\Delta f_{r0})$$

for the radar resolution cell smaller than an ocean wavelength. Thus, an experimental determination of the cross-correlation function along with a prior knowledge of the pupil function in range for the radar processor would lead to a determination of the characteristic function for the ocean wave heights from which the wave height spectra of the ocean waves may be determined. When the radar resolution cell is larger than the ocean wavelength, Eq. (9b) can be used to interpret the radar data to obtain information on the distribution of wave heights. When the radar resolution is smaller than an ocean wavelength, Eq. (9c) provides a distribution of wave slopes, and knowledge of the radar resolution cell size can be used to convert this information into wave height information. Also, note by examining the rate of change of $R(\Delta f_{r0})$ as a function of $\sigma_H$, that the sensitivity of the measurement of $\sigma_H$ from $R(\Delta f_{r0})$ increases with $\sigma_H$. The pupil fraction $\Gamma_r(\Delta f_{r0})$ in Eq. (9a) has the effective width $(\Delta f_r/\Delta f_{r0})$. For $\Delta f_{r0}$ larger than $\Delta f_r/2$, the cross-correlation function becomes very small, and for a measurement of the characteristic function $\eta_H$, it is necessary to measure $R(\Delta f_{r0})$ for $\Delta f_{r0} < \Delta f_r/2$. While the theoretical form of the pupil function $\Gamma_r(f_r)$ is a step function of bandwidth $\Delta f_r$, practical radar systems do not realize this functional form because of the antenna pattern and nonlinearities in the data recording and processing operations.

The result in Eq. (9a) could have been obtained directly from simple physical considerations by adding up the phases of the electric field reflected by the terrain within a resolution cell area of the terrain. The pupil function factor $\Gamma_r(\Delta f_{r0})$ is a direct consequence of the nonvertical angle of incidence of the radar radiation, and the characteristic function factor $\eta_H$ is a consequence of the phase variations for reflection from a rough surface.

In order to obtain an experimental evaluation of $<I_{P1}(f_{r0})I_{P1}(f_{r0} + \Delta f_{r0})>$ in Eq. (9a) for a given ocean area, the optical processor of FIG. 3 has been used to obtain the successive images $I(x, y, f_{r0})$, $I(x, y, f_{r0} + \Delta f_{r01})$, ... $I(x, y, f_{r0} + \Delta f_{r0n})$ at the frequencies $f_{r0}, f_{r0} + \Delta f_{r01}, \ldots f_{r0} + \Delta f_{r0n}$ but for the fixed processing bandwidth of $\Delta f_r$. The image $I(x, y, f_{r0})$ in the map film 23 is placed in plane I of the optical cross-correlator in FIG. 4, and using the time codes in these images as a reference for accurate superposition of the image $I(x, y, f_{r0})$ on $I(x, y, f_{r0} + \Delta f_{r0k})$ at plane II, the quantity $W_{\Delta f_r}(\Delta f_{r0k}, 0, 0)$ is measured for each successive $I(x, y, f_{r0} + \Delta f_{r0k})$. In order to account for the effects of laser power fluctuations and background exposures on the film, a measurement of $W_{\Delta f_r}(\Delta f_{r0k})$ is also made for large $\Delta x, \Delta y$, and this is subtracted from $W_{\Delta f_r}(\Delta f_{r0k}, 0, 0)$. To normalize the effects of average intensity variations for different $I(x, y, f_{r0} + \Delta f_{r0k})$ further, the difference $$[W_{\Delta f_r}(\Delta f_{r0k}, 0, 0) - W_{\Delta f_r}(\Delta f_{r0k}, \Delta x, \Delta y)]$$

is divided by the correlation number when there is no frequency shift, i.e., by $W_{\Delta f_r}(0, 0, 0) - W_{\Delta f_r}(0, \Delta x, \Delta y)$. The resulting curve $R^E(\Delta f_{r0})$, which is defined by $$\frac{W_{\Delta f_r}(\Delta f_{r0k},0,0) - W_{\Delta f}(\Delta f_{r0k},\Delta x,\Delta y)}{W_{\Delta f_r}(0,0,0) - W_{\Delta f_r}(0,\Delta x,\Delta y)}$$

is plotted as a function of $\Delta f_{r0}$ and corresponds to the normalized value of $|<I_{P1}(f_{r0})I_{P1}(f_{r0} + \Delta f_{r0})>|^2$, the area on the image correlated being controlled by the pupil P. The quantity $R^E(\Delta f_{r0})$ measured by the cross-correlator is equivalent to $R(\Delta f_{r0})$ defined in Equation (9a), the superscript E being used to differentiate between the experimental and the theoretical functions involved.

Figure 5:
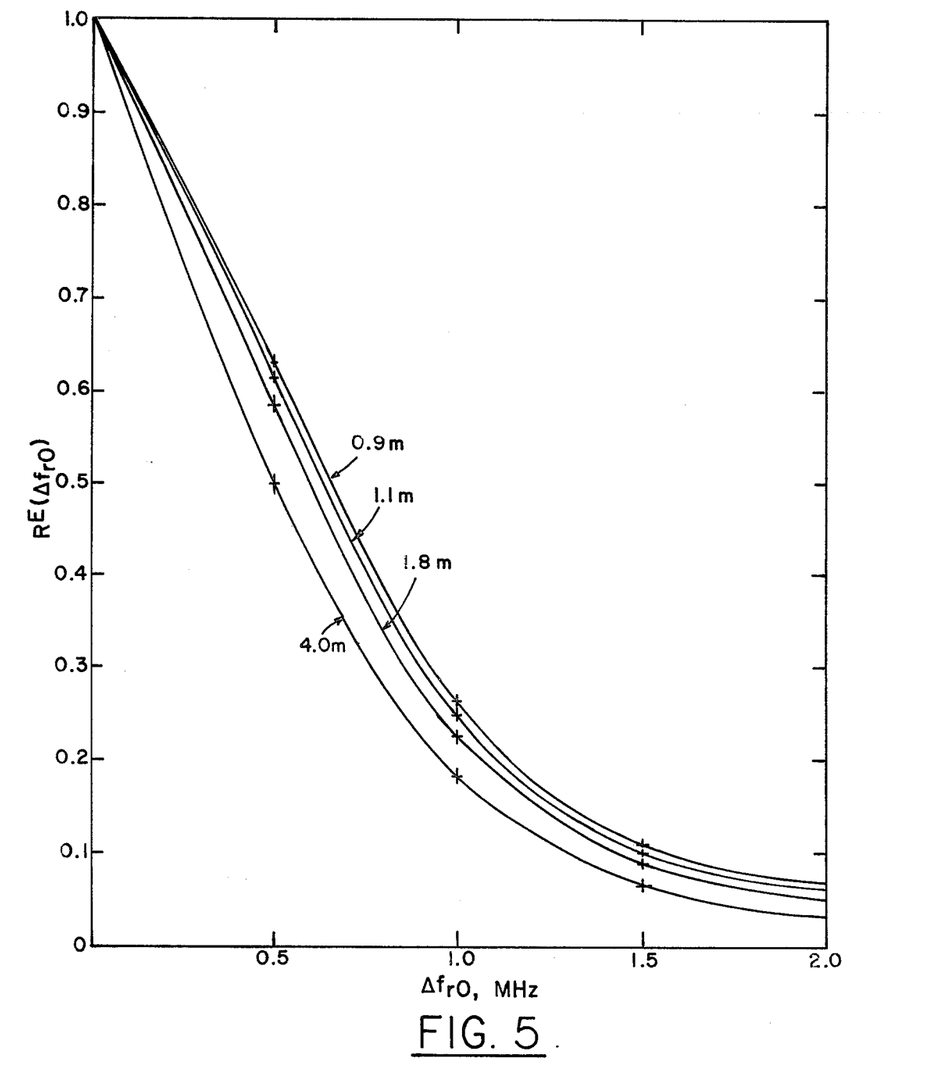
FIG. 5 illustrates cross-correlation data curves, $R^E(\Delta f_{r0})$, for the ocean wave heights of 0.9, 1.1, 1.8, and 4 m as a function of frequency separation for the chirp center frequencies used in the processing using a chirp bandwidth equal to 2 MHz.

FIG. 5 is a plot of the function $R^E(\Delta f_{r0})$ from experimental data where the bandwidth used in processing the successive images was 2 MHz, the processing chirp frequency interval for each successive pair being 0.5 MHz. Since the curves are a product of the characteristic function for the ocean wave heights and the radar pupil function, and since the radar pupil function falls quite drastically for the frequency separations greater than half the chirp bandwidth for the radar processor, it is necessary to confine the examination of the experimental curves for $\Delta f_{r0} < 1$ MHz to obtain the wave height information. For a given ocean area, the curves were obtained by performing cross-correlations over different portions of that area, and the deviation of the values of $R^E(\Delta f_{r0})$ for a given $\Delta f_{r0}$ was approximately ±0.05. As expected, no effect was noticed for the variation of $R^E(\Delta f_{r0})$ for different positions along the y-axis since the radar aperture function is independent of the look angle.

An examination of $R^E$(0.5 MHz) shows a variation in the wavelength decorrelation with respect to the ocean wave heights involved, and the points appear to fit the curve $0.65 \exp(-0.066\sigma_H)$, where $\sigma_H$ is the significant wave height. The coefficient 0.066 in the exponential is due to the decorrelation factor from phase changes from crest to trough of a wave, and is close to the theoretical value of $[16\pi(\Delta f_{r0}/c)]$. The factor of 0.65 is the value of the radar chirp spectrum function at 0.5 MHz.

The dependence of the decorrelation function $R^E(\Delta f_{r0})$ on the chirp spectrum bandwidth used was verified by obtaining the curves $R^E(\Delta f_{r0})$ for 6-, 4-, 2-, 1-, and 0.5-MHz bandwidths, and extensive decorrelation was noted for the frequency separations $\Delta f_{r0}$ equal to half the bandwidth employed in the processing. For an infinite-bandwidth radar, the effect on the decorrelation should be nonexistent. By extrapolating the $R^E(0.5$ MHz) for an infinite bandwidth and comparing this result for $R^E(0.5$ MHz) at 2 MHz, the value of 0.65 for the chirp aperture effect was verified.

When the cross-correlation function, $R^E(\Delta f_{r0})$, is evaluated for the frequency separation of $\Delta f_{r0} = 1$ MHz for the different wave heights, the functional value obtained is $0.29 \exp(0.12\sigma_H)$. The doubling of the factor in the exponent is due to the doubling of $\Delta f_{r0}$. The effect of the chirp spectrum aperture function is given by the factor 0.29 for this case.

The chirp aperture function is the Fourier transform of the radar resolution in range. This resolution can be readily measured in the optical processor of FIG. 4 by plotting $R^E(O)$ for different position separations of the two films being correlated, and an experimental examination of this resolution function shows that the width of the resolution cell is inversely proportional to the chirp bandwidth used.

In these results, attention has been focused on measuring the effect on the radar images due to different effective frequencies of the radar operation. A similar calculation and experimental procedure can be employed to exploit the effect on the radar images of different look angles for the radar, and this can be done by processing the radar data for different Doppler bandwidths and cross-correlating these images as a function of the center Doppler frequency separations for these bandwidths.

To summarize the operation of the digital processor shown in FIG. 1(a) in accordance with the system theory discussed in detail above, a synthetic-aperture radar return signal $S(t)$ of bandwidth $f_r$ is separated into a plurality of frequency channels by functional blocks (match filters 1, 2 ... N, each channel of predetermined width, $\Delta f_r$, over the entire available bandwidth as shown in FIG. 1(b) for a chirp or Doppler spectrum. The chirp spectrum is used for images to one side of the radar track, and the Doppler spectrum is used for images along the radar track. The outputs of the match filters are electric field images which are squared by the squarers 11, 12 ... NN to obtain intensity images $I_1(x)$, $I_2(x)$ ... $I_n(x)$. These images are degraded since only a part of the chirp or Doppler spectrum is used for each, but height information is the objective, not a high resolution image.

These intensity images are cross-correlated by the circuit 20, but first the image $I_1(x)$ is auto-correlated (i.e., cross-correlated with itself) to obtain a normalizing factor to be applied to subsequent cross-correlations. Assuming a normalizing factor of unity for simplicity of description, the image $I_1(x)$ is then cross-correlated with each of the images $I_2(x)$ through $I_n(x)$ over a selected area. These cross-correlation functions are calculated and fixed (e.g., zero) components of these cross-correlation values are plotted as a function of the spacings of the center frequencies for the channels to obtain the characteristic functions of the ocean wave heights as shown in FIG. 5. These plotted curves calibrate the processor for subsequent wave height measurements. Thus a measure of the value of these curves for a given frequency spacing, e.g. $\Delta f_{r0} = 0.5$, provides a direct indication of the ocean wave heights as a function of the slope of the curves. Consequently, the output of the slope detector 21 is a direct indication of ocean wave height. In other words, after once calibrating the system from data plotted as in FIG. 5, the system will provide wave height data directly from the ratio of the cross-correlation function, $R^E(\Delta f_{r0})$, to the frequency spacing, $\Delta f_{r0}$.

The functions of the digital processor shown in FIG. 1(a) are implemented optically in an analogous manner. The optical processor shown in FIG. 3 performs the functions of the match filters 1, 2 ... N of FIG. 1(a), and the map film, which records the electric field images thus derived from the radar signal recorded on a data film 22, inherently squares the electric field images thus performing the functions of the squarers 11, 12 ... NN of FIG. 1(a). Two copies are made of one of the intensity images thus recorded, such as for channel $f_{r01}$. One is placed in plane I in the optical processor shown in FIG. 4 for cross-correlation with the other intensity images recorded on the other map film placed at plane II of FIG. 4. The pupil P selects the area of the intensity image in plane I to be cross-correlated. The cross-correlation functions at plane III are detected by a detector 32 and displayed on a cathode ray tube 33 and/or recorder 34. Once the system has been calibrated, the output of the detector 32 provides a direct indication of wave height just as in the case of the digital processor of FIG. 1(a). There is thus shown an optical processor that is directly analogous to the digital processor.

Although particular embodiments of the invention have been described and illustrated herein, it is recognized that modifications and variations may readily occur to those skilled in the art. It is therefore intended that the claims be interpreted to cover such modifications and variations.

What is claimed is:

1. Apparatus for determining heights of ocean waves or terrain peaks utilizing synthetic-aperture radar to attain a return signal from said waves or peaks, said signal having a spectrum of bandwidth $f_r$, comprising
   means for compressing said radar signal over different bandwidths, $\Delta f_r$, of said spectrum to obtain a plurality of intensity images $I_1(x)$, $I_2(x)$, ... $I_n(x)$, said bandwidths being centered at frequencies $f_{r01}$, $f_{r02}$, ... $f_{r0n}$, each spaced by a frequency difference of $\Delta f_{r0}$ from the first $f_{r01}$, and
   means for cross-correlating a selected area of one of said images with a corresponding area of at least one of the other of said images to determine a cross-correlation function value $R^E(\Delta f_{r0})$ for a given spacing $\Delta f_{r0}$ which is a function of height of said waves or peaks.

2. Apparatus as defined in claim 1 wherein said means for cross-correlating said selected area of said one of said images with a corresponding area of each of said other images includes means for recording a predetermined component of the resulting cross-correlation values as a function of the spacing of the center frequencies for the bandwidths of the cross-correlated images, whereby a measure of the value of a plotted curve for a given frequency spacing provides a direct indication of height.

3. Apparatus as defined in claim 2 wherein said compressing means is comprised of a plurality of filter means of bandwidth $\Delta f_r$, one for each center frequency $f_{r01}, f_{r02}, \ldots f_{r0n}$, and each of predetermined width $\Delta f_r$, and means for squaring the output signal of each filtering means to obtain an intensity image signal, and said cross-correlating means includes means for cross-correlating a selected area of a first intensity image signal $I_1(x)$ with a corresponding area of each of said intensity image signals to form the cross-correlation values equal to $\int I_1(x)I_k(x)dx$ for $k = 1, 2, \ldots n$, thus providing cross-correlation values $R^E(\Delta f_{r0})$ for the center frequency spacing, $\Delta f_{r0}$, of said intensity images cross-correlated.

4. Apparatus as defined in claim 1 wherein said corresponding means includes optical filtering means operating on said radar signal stored on a data film transparency, and produces a film transparency recording of said intensity images, and said cross-correlating means is comprised of optical means for superimposing a selected area of one intensity image on one film transparency over corresponding areas of other intensity images on another film transparency, and means for detecting the cross-correlated values of said images, thus providing cross-correlation values $R^E(\Delta f_{r0})$ for the center frequency spacing, $\Delta f_{r0}$, of said intensity images thus cross-correlated.

5. Apparatus as defined in claim 4 wherein said cross-correlating means comprises means for positioning one film relative to the other for superimposing one optical image at one plane on an optical image in the other film in another plane, a source of light for transilluminating said films to produce superimposed images, means for detecting the product of said images thus superimposed at a third plane, and a pupil for restricting light from said source to a selected area of said films to produce said superimposed images at only said selected area.

* * * * *